United States Patent
Nakagawa

(10) Patent No.: US 9,041,591 B2
(45) Date of Patent: May 26, 2015

(54) METHOD, DEVICE AND PROGRAM FOR PROCESSING SIGNALS, AND RADAR APPARATUS

(75) Inventor: Kazuya Nakagawa, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 666 days.

(21) Appl. No.: 13/299,370

(22) Filed: Nov. 18, 2011

(65) Prior Publication Data
US 2012/0127018 A1    May 24, 2012

(30) Foreign Application Priority Data
Nov. 19, 2010    (JP) .................................. 2010-259368

(51) Int. Cl.
| | |
|---|---|
| *G01S 13/42* | (2006.01) |
| *G01S 7/10* | (2006.01) |
| *G01S 13/04* | (2006.01) |
| *G01S 7/06* | (2006.01) |
| *G01S 7/292* | (2006.01) |
| *G01S 13/93* | (2006.01) |

(52) U.S. Cl.
CPC ................. *G01S 13/04* (2013.01); *G01S 7/064* (2013.01); *G01S 7/10* (2013.01); *G01S 7/2923* (2013.01); *G01S 13/9307* (2013.01)

(58) Field of Classification Search
CPC ........... G01S 13/04; G01S 7/064; G01S 7/10; G01S 7/2923; G01S 13/9307
USPC ........... 342/27, 185, 89–90, 91, 93, 159–160, 342/162, 195, 175–176, 179, 181
See application file for complete search history.

(56) References Cited

U.S. PATENT DOCUMENTS

| | | | | |
|---|---|---|---|---|
| 5,001,650 | A  * | 3/1991 | Francis et al. ................ | 348/169 |
| 5,097,268 | A  * | 3/1992 | Bauer et al. ................... | 342/160 |
| 6,198,429 | B1 * | 3/2001 | Fujikawa et al. ............. | 342/176 |
| 2008/0169974 | A1* | 7/2008 | Fujikawa et al. ............. | 342/179 |
| 2010/0085244 | A1* | 4/2010 | Kojima ......................... | 342/179 |
| 2010/0188290 | A1* | 7/2010 | Vacanti ......................... | 342/385 |
| 2010/0214151 | A1* | 8/2010 | Kojima et al. ................. | 342/28 |

FOREIGN PATENT DOCUMENTS

| | | | |
|---|---|---|---|
| JP | 08-015407 | A | 1/1996 |
| JP | 11-044753 | A | 2/1999 |
| JP | 11-094931 | A | 4/1999 |
| JP | 11-352212 | A | 12/1999 |
| JP | 2010-249648 | A | 11/2010 |

\* cited by examiner

*Primary Examiner* — John B Sotomayor
(74) *Attorney, Agent, or Firm* — Global IP Counselors, LLP

(57) ABSTRACT

A signal processing device, which includes an echo signal input module for inputting echo signals from an antenna discharging electromagnetic waves to a predetermined area and receiving the echo signals reflected on a target object, an echo signal level detection module for detecting a level of each of the echo signals from each location within the predetermined area, a target object detection module for detecting the target object based on the levels of the echo signals, a correlation processing module for performing scan-to-scan correlation processing of a plurality of scans, and a level adjustment module for adjusting the levels of the echo signals after the scan-to-scan correlation processing. The level adjustment module adjusts the levels of the echo signals corresponding to the locations where the target object detection module detects the target object.

13 Claims, 7 Drawing Sheets

| n-2 | n-1 | n | n+1 | n+2 | Y |
|---|---|---|---|---|---|
| 0 | 0 | 0 | 0 | 0 | 0 |
| 0 | 0 | 0 | 0 | 1 | 0 |
| 0 | 0 | 0 | 1 | 0 | 0 |
| 0 | 0 | 0 | 1 | 1 | 0 |
| 0 | 0 | 1 | 0 | 0 | 0 |
| 0 | 0 | 1 | 0 | 1 | 0 |
| 0 | 0 | 1 | 1 | 0 | 1 |
| 0 | 0 | 1 | 1 | 1 | 1 |
| . | . | . | . | . | . |
| 0 | 1 | 1 | 0 | 0 | 1 |
| 0 | 1 | 1 | 0 | 1 | 1 |
| 0 | 1 | 1 | 1 | 0 | 1 |
| 0 | 1 | 1 | 1 | 1 | 1 |
| . | . | . | . | . | . |
| 1 | 1 | 1 | 0 | 0 | 1 |
| 1 | 1 | 1 | 0 | 1 | 1 |
| 1 | 1 | 1 | 1 | 0 | 1 |
| 1 | 1 | 1 | 1 | 1 | 1 |

METHOD, DEVICE AND PROGRAM FOR PROCESSING SIGNALS, AND RADAR APPARATUS

CROSS-REFERENCE TO RELATED APPLICATION(S)

The application claims priority under 35 U.S.C. §119 to Japanese Patent Application No. 2010-259368, which was filed on Nov. 19, 2010, the entire disclosure of which is hereby incorporated by reference.

TECHNICAL FIELD

The present invention relates to a method, device and program for processing signals that carry out various processing to echo signals, and also relates to a radar apparatus including the device.

BACKGROUND OF THE INVENTION

When displaying a screen image of one or more target objects (echo image), conventional radar apparatuses suppress echoes that do not always continuously appear at the same location (e.g., sea clutters), and carry out scan-to-scan correlation processing for accentuating the echoes of the target objects (see JP11-352212A, for example).

However, when a moving speed of the target object is fast, an echo of the target object detected at a certain location during a predetermined scan may also be detected during the next scan at a location distant from the location of the last scan. In such a case, as a correlation of the two echoes at the same location becomes low, the echoes of the target object will be weakened by the scan-to-scan correlation processing.

SUMMARY OF THE INVENTION

Thus, the present invention is made in view of the above situation, and provides a method, device and program for processing signals that prevent echoes of a target object from becoming weaker by the scan-to-scan correlation processing, and also provides a radar apparatus including the device.

According to one aspect of the present invention, a signal processing device is provided, which includes an echo signal input module for inputting echo signals from an antenna discharging electromagnetic waves to a predetermined area and receiving the echo signals reflected on a target object, an echo signal level detection module for detecting a level of each of the echo signals from each location within the predetermined area, a target object detection module for detecting the target object based on the levels of the echo signals, a correlation processing module for performing scan-to-scan correlation processing of a plurality of scans, and a level adjustment module for adjusting the levels of the echo signals after the scan-to-scan correlation processing. The level adjustment module may adjust the levels of the echo signals corresponding to the locations where the target object detection module detects the target object.

At the locations where the target object is detected, strong echo signals will be detected. Therefore, by carrying out the level adjustments (accentuation) of the echo signals at these locations, it can output high-level signals, even if the echo signals of the target object moving at high speed become weaker by the scan-to-scan correlation.

In one embodiment, the level adjustment module may additionally perform the level adjustment of the echo signal at a location close to the location where the target object detection module detects the target object. Specifically, in one embodiment, the level adjustment module may perform the level adjustment with a characteristic based on a Gauss function, centered on each location where the target object detection module detects the target object.

Thereby, it can prevent the echo signals from being extremely accentuated only at particular locations.

In one embodiment, the level adjustment module may perform the level adjustment with a level adjustment amount that is obtained by combining the characteristics based on the calculated Gauss functions centered on the respective locations.

In this case, stronger accentuation processing will be carried out, when a target object is detected continuously at physically-close locations. Since the echo signals become stronger as the size of the target object is larger, the accentuation processing is performed taking the target object size into greater consideration.

In one embodiment, the target object detection module may detect a presence or absence of the target object at every location, and the level adjustment module may perform the level adjustment when a pattern of the presence or absence of the target object at each location matches a predetermined pattern.

It determines that a target object does not exist, for example, when the level at a location near the currently-observing location is very low, even if the level at the currently-observing location indicates the presence of a target object.

In one embodiment, the level adjustment module may change an amount of the level adjustment depending on the pattern.

For example, if the levels are lower at locations near the antenna than at currently-observing location, and conversely, when the levels are higher at locations distant from the antenna than at the currently-observing location, the accentuation is set weaker because the currently-observing location can be determined to be an end of the target object.

In one embodiment, the target object detection module may detect that the target object exists when the levels of the echo signals exceed a predetermined threshold.

In one embodiment, the target object detection module may set the threshold according to a distance of the echo signals from the antenna.

According to another aspect of the present invention, a radar apparatus is provided, which includes the signal processing device, an antenna for revolving while discharging electromagnetic waves for every azimuth and receiving echo signals, and an echo image display module for displaying an echo image based on the echo signals after the level adjustment module adjusts the levels.

At the locations where the target object is detected, strong echo signals will be detected. Therefore, by carrying out the level adjustments (accentuation) of the echo signals at these locations, it can output high-level signals, even if the echo signals of the target object moving at high speed become weaker by the scan-to-scan correlation.

According to another aspect of the present invention, a method of processing signals is provided, which includes inputting echo signals from an antenna discharging electromagnetic waves to a predetermined area and receiving the echo signals reflected on a target object, detecting a level of each of the echo signals from each location within the predetermined area, detecting the target object based on the levels of the echo signals, performing scan-to-scan correlation processing of a plurality of scans, and adjusting the levels of the echo signals after the scan-to-scan correlation processing.

The adjusting step may adjust the levels of the echo signals corresponding to the locations where the target object is detected.

At the locations where the target object is detected, strong echo signals will be detected. Therefore, by carrying out the level adjustments (accentuation) of the echo signals at these locations, it can output high-level signals, even if the echo signals of the target object moving at high speed become weaker by the scan-to-scan correlation.

According to another aspect of the present invention, a computer-readable program for processing signals is provided, which includes causing a computer to input echo signals from an antenna discharging electromagnetic waves to a predetermined area and receiving the echo signals reflected on a target object, causing a computer to detect a level of each of the echo signals from each location within the predetermined area, causing a computer to detect the target object based on the levels of the echo signals, causing a computer to perform scan-to-scan correlation processing of a plurality of scans, and causing a computer to adjust the levels of the echo signals after the scan-to-scan correlation processing. The adjusting step may adjust the levels of the echo signals corresponding to the locations where the target object is detected.

At the locations where the target object is detected, strong echo signals will be detected. Therefore, by carrying out the level adjustments (accentuation) of the echo signals at these locations, it can output high-level signals, even if the echo signals of the target object moving at high speed become weaker by the scan-to-scan correlation.

According to the aspects of the present invention, it can prevent the echoes of a target object from becoming weaker by the scan-to-scan correlation processing.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1A:
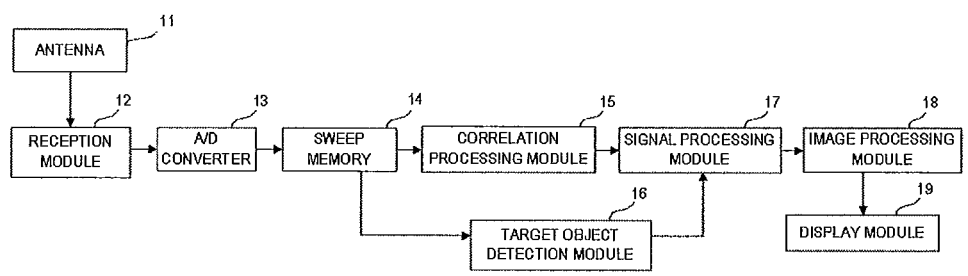
FIGS. 1A and 1B are block diagrams showing a configuration of a radar apparatus according to one embodiment of the present invention.

FIG. 1A is a block diagram showing a configuration of a radar apparatus according to one embodiment of the present invention, which includes a built-in signal processing device according to one embodiment of the present invention. The radar apparatus is installed, for example in a ship. The radar apparatus transmits and receives electromagnetic waves around own ship, and detects target objects, such as other ships.

As shown in FIG. 1A, the radar apparatus includes an antenna 11, a reception module 12, an A/D converter 13, a sweep memory 14, a correlation processing module 15, a target object detection module 16, a signal processing module 17, an image processing module 18, and a display module 19.

The antenna 11 transmits the electromagnetic waves in all directions around own ship and receives echo signals. The reception module 12 outputs a value according to a level of the echo signal received by the antenna 11 to the A/D converter 13. The A/D converter 13 carries out digital conversion of the inputted echo signal of an analog value, and outputs the converted signal to the sweep memory 14.

The sweep memory 14 stores the measurement data for one scan (360° around own ship). Each measurement data is stored as sample data associated with each location in a polar coordinate system (an azimuth and a distance).

The correlation processing module 15 calculates a correlation between the newest sample data inputted from the sweep memory 14 and past sample data (e.g., one scan before) at the same location, and performs scan-to-scan correlation processing for outputting the correlation as new sample data. The scan-to-scan correlation processing is performed for example by weighted summation by setting weight on sample data at each location.

The target object detection module 16 detects the existence of a target object at each location based on the sample data inputted from the sweep memory 14. The target object detection module 16 determines the existence of a target object when the value of the sample data exceeds a predetermined threshold, and it outputs the determination result as a binary value (e.g., 1 when exceeding the threshold, and 0 when below the threshold).

Note that the threshold may be suitably changed according to a distance from own ship (antenna). More particularly, it may be desirable to perform the target object detection processing, while updating the threshold at the currently-observing location based on the level of the sample data at the currently-observing location, the level of the sample data at one or more locations close to own ship, and the determination result using the currently set threshold.

The signal processing module 17 performs level adjustment processing of the sample data (accentuation processing) after the scan-to-scan correlation processing.

The image processing module 18 inputs the sample data after the level adjustment which is outputted from the signal processing module 17, converts it into data of an rectangular coordinate system with own ship location set at an origin, and outputs the converted data to the display module 19. The sample data converted into the data of the rectangular coordinate system is used as a pixel luminance value of the display module 19. Therefore, an image having the luminance according to the levels of the echo signals are displayed on the display module 19.

Here, since the location of the target object changes greatly between scans when a moving speed of the target object is fast, the level of the sample data after the scan-to-scan correlation processing may fall, if the weighted summation for the scan-to-scan correlation processing is performed at the same location. Therefore, in this embodiment, when a target object is detected by the target object detection module 16, the signal processing module 17 carries out the level adjustment of the sample data after the scan-to-scan correlation processing at the detected location, thereby preventing that the echo signal of the target object moving at high speed becomes weaker by the scan-to-scan correlation processing.

Figure 1B:
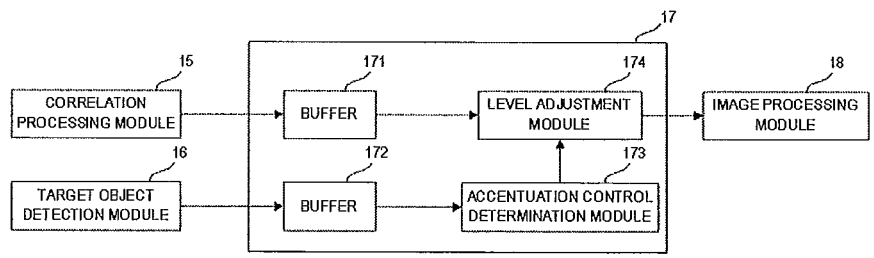

Hereinafter, processing by the target object detection module 16 and the signal processing module 17 is described in greater detail. FIG. 1B is a functional block diagram showing a particular configuration of the signal processing module 17. The signal processing module 17 includes, functionally, buffers 171 and 172, an accentuation control determination module 173, and a level adjustment module 174. It will be appreciated that these components may be achieved by using hardware and/or software (computer-readable/executable program).

The buffer 171 holds a predetermined number of the sample data outputted from the correlation processing module 15. It will be appreciated that the sampling number (the number of the sample data) may correspond to the number of sweeps required for the level adjustment processing (for example, about five) and, thus, the sample data for all the sweeps do not need to be held.

The buffer 172 holds a predetermined number of the target object detection results of the target object detection module 16. In this embodiment, the sampling numbers held by the buffer 171 and the buffer 172 are the same. As previously described, since the target object detection module 16 outputs the value 1 when the value of each sample data exceeds the threshold and outputs the value 0 when below the threshold, the buffer 172 holds the detection results at each distance for a plurality of sweeps (e.g., five sweeps), as shown in FIG. 2.

The accentuation control determination module 173 reads out the detection result currently held in the buffer 172, and outputs a signal indicating whether or not the accentuation processing of the level adjustment module 174 is performed (accentuation control signal), based on the read detection result. Particularly, as shown in FIG. 2, the accentuation control determination module 173 outputs to the level adjustment module 174 the accentuation control signal which instructs to perform the accentuation processing when detection results at the same distance for five sweeps (including the sweep of the currently-observing data, the two sweeps before and the two sweeps after the currently-observing sweep) satisfy a predetermined condition (in this case, the accentuation control signal Y is set to Y=1). If the condition is not satisfied, the accentuation control determination module 173 outputs to the level adjustment module 174 the accentuation control signal which instructs not to perform the accentuation processing (in this case, the accentuation control signal Y is set to Y=0).

Figures 2, 3:
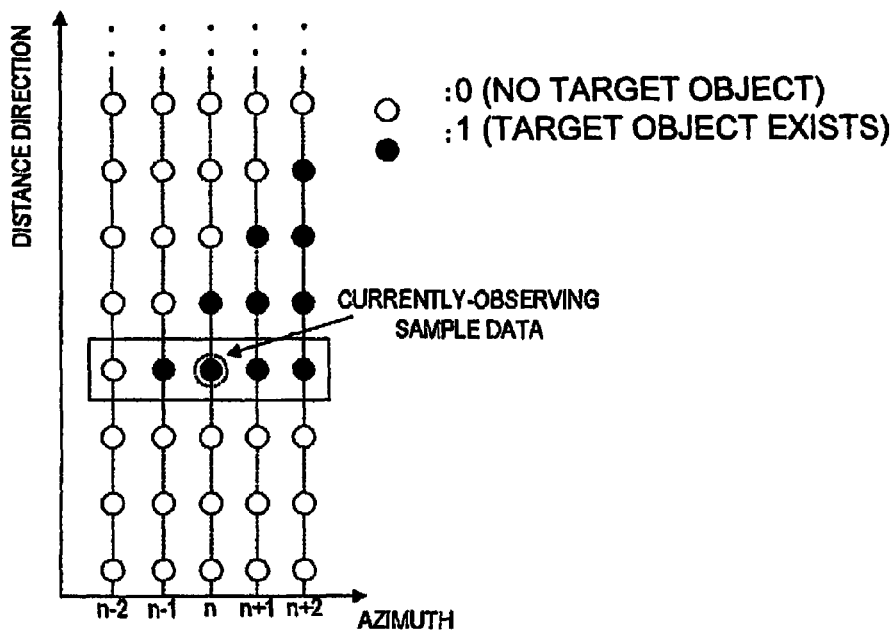
FIG. 2 is a view showing a target object detection result which is held in a buffer.
FIG. 3 is a view showing a relation between the target object detection result and an accentuation control signal.

FIG. 3 is a view showing a relation between the target object detection result and the accentuation control signal. The accentuation control determination module 173 refers to a table shown in FIG. 3 by using the five detection results at the same distance to change the accentuation control signal. For example, when all the detection results of a currently-observing sweep n, two sweeps before (n−2), one sweep before (n−1), one sweep after (n+1), and two sweeps after (n+2) are 0 (no target objects exist), the accentuation control signal Y=0, which causes not to perform the accentuation processing, is outputted. Alternatively, for example, when the detection results of the currently-observing sweep n and the sweep n+1 are 1 (a target object exists), and when the detection results of other sweeps are 0 (no target objects exist), the accentuation control signal Y=1, which causes to perform the accentuation processing, is outputted. Note that, for example, when the detection result of only the currently-observing sweep n is 1 (a target object exists), the accentuation control signal Y=0, which causes not to perform the accentuation processing, is outputted because a high-level echo signal is unexpectedly detected due to interference, noise, etc.

The level adjustment module 174 performs the level adjustment of the sample data at a location where the accentuation control signal Y=1 is inputted. Here, the level adjustment module 174 performs the level adjustment of the sample data at a location where the accentuation control signal Y=1 is inputted, including the sample data at locations close to the location where the accentuation control signal Y=1 is inputted.

Figure 4A:
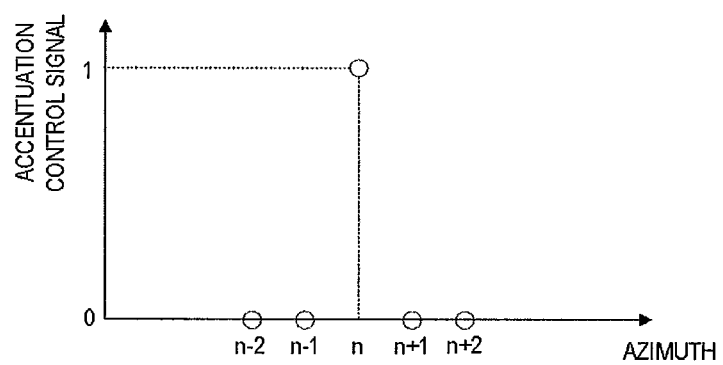
FIGS. 4A and 4B are plots showing a relation between the accentuation control signal and a level adjustment amount.
Figure 4B:
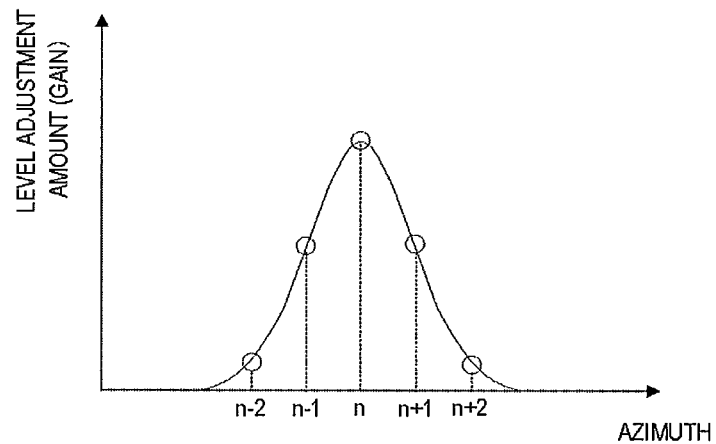

FIGS. 4A and 4B are plots showing a relation between the accentuation control signal and the level adjustment amount. FIG. 4A shows an example accentuation control signal in the accentuation control determination module 173, and FIG. 4B shows an example level adjustment amount (gain) in the level adjustment module 174. Note that, in FIGS. 4A and 4B, although an example gain in a case where that accentuation control signal of only the currently-observing sweep n is 1 is shown in order to facilitate the explanation, as shown in FIG. 3 it may be desirable not to perform the accentuation processing when only the currently-observing sweep n is 1.

The level adjustment module 174 performs the level adjustment with a characteristic based on a Gauss function centered on the location where the accentuation control signal Y=1 is inputted, as shown in FIGS. 4A and 4B. That is, the level adjustment module 174 uses a characteristic where the gain is the highest at the location where the accentuation control signal Y=1 is inputted as the center, and lowers the gain gradually as it goes away from the center location. Thereby, it can prevent that the echo signals are extremely accentuated at particular locations. Note that, any other characteristics other than the Gauss function described above may be used as long as the characteristics are such that the gain lowers smoothly as it goes away from the center location, centering on the location where the accentuation control signal Y=1 is inputted.

Figure 5:
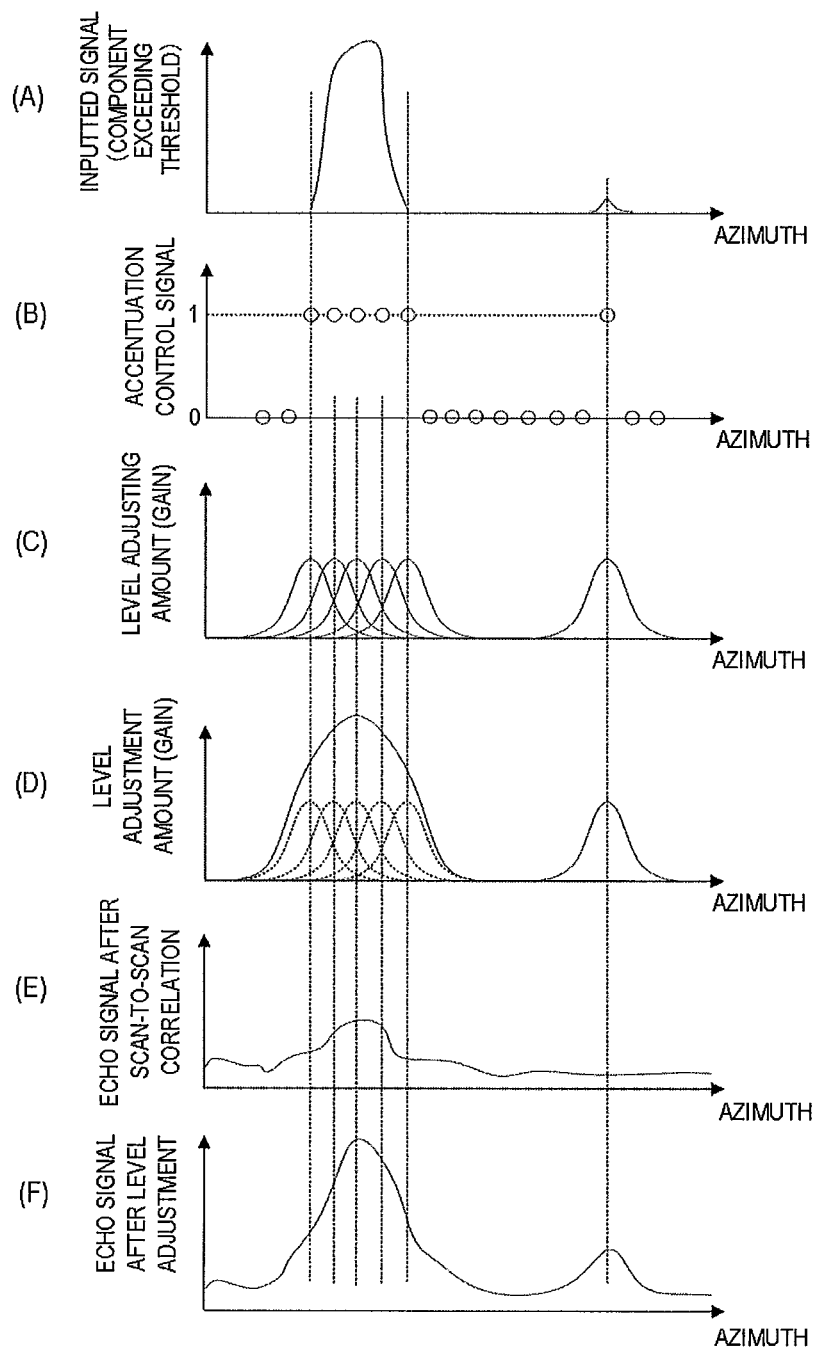
FIG. 5 shows charts of an example of level adjustment.

In FIGS. 4A and 4B, although the example where the accentuation control signal Y is 1 at only one location is shown, it may be desirable to ultimately perform the level adjustment with a level adjustment amount which is obtained by combining the Gauss function characteristics calculated at respective locations. FIG. 5 shows charts of an example level adjustment. Here, first, the following description will be made assuming that the sample data as shown in the part (A) of FIG. 5 (a component of the inputted signal exceeding the threshold) is inputted. In this example, the echo signals of a comparatively large target object moving at high speed and a comparatively small target object are inputted.

In this case, the accentuation control determination module 173 outputs the accentuation control signal Y=1 for the location where the component exceeding the threshold is inputted, as shown in the part (B) of FIG. 5. In this part (B), it is described assuming that the components continuously exceeding the threshold at five locations corresponding to the comparatively large target object moving at high speed are inputted, and the accentuation control signal Y=1 is outputted at one location corresponding to the comparatively small target object.

In this case, the level adjustment module 174 calculates the gain characteristic based on a Gaussian distribution centered on the respective locations where the accentuation control signals Y=1 are inputted, as shown in the part (C). As shown in the part (D), the gain characteristics calculated at the respective locations are combined to calculate a final gain characteristic. Then, as shown in the part (E) regarding the comparatively large target object moving at high speed, the level of the echo signal after the scan-to-scan correlation processing falls. However, as shown in the part (D), since the final combined gain characteristic is carried out the level adjustment with the gain obtained by combining the gains at the five physically-close locations, strong accentuation processing is thus applied, thereby outputting a strong echo signal as shown in the part (F). On the other hand, regarding the comparatively small target object, the echo signal is weakened almost to a noise level by the scan-to-scan correlation processing. However, as a result of the level adjustment, the echo signal is strengthened to the level which allows displaying an echo image from which the existence of a target object can be recognized.

Thus, in the level adjustment of this embodiment, stronger accentuation processing is carried out when a target object is detected continuously at physically-close locations. Therefore, since the echo signal becomes stronger as the size of the target object is larger, the accentuation processing is carried out taking the target object size into consideration.

Figure 6:
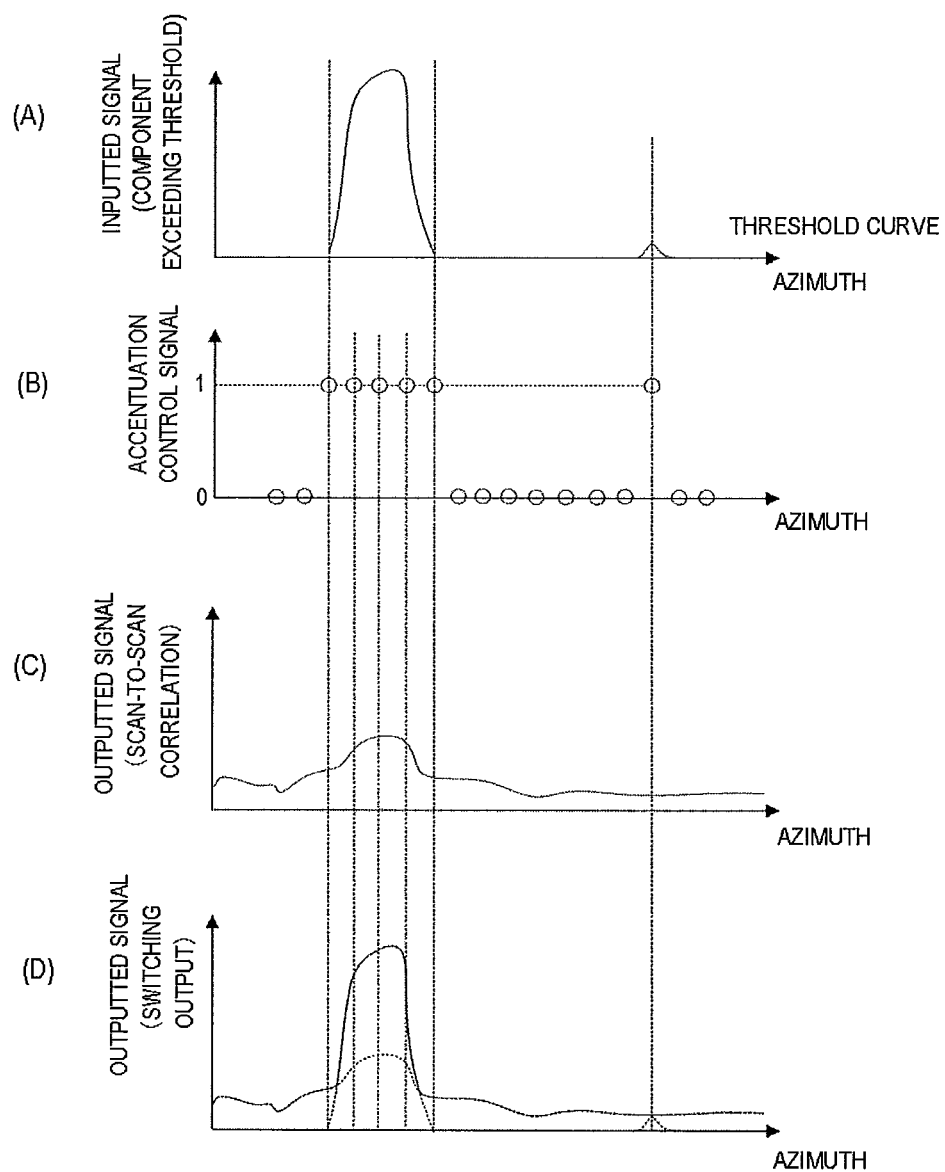
FIG. 6 shows charts of example signals when performing signal switch processing.

Note that, for example, as shown in FIG. 6, a mode where only at the locations where the accentuation control signal is set, the signal is switched to the signal before the scan-to-scan correlation processing (referred to as a "direct-path signal") may also be considered. However, in this case, since different signals (echo signals of extremely high level) only at the locations where the accentuation control signals are set are outputted, only certain locations with accentuated echo signals will be outputted. However, since the level adjustment of this embodiment is performed with the gain characteristic according to the Gaussian distribution, it can prevent that the echo signal is only extremely accentuated at certain locations. Meanwhile, regarding the comparatively small target object as shown in the part (A) of FIG. 6, since the level of the component exceeding the threshold is low, as shown in the part (D) of FIG. 6 even if the signal is switched, as the signal component has a lower level than that of the noise component, it cannot be accentuated. In this regard, since the level adjustment of this embodiment performs a stronger accentuation in response to physically-close locations continuously detected, without regard to the absolute level of the component exceeding the threshold, small target object can also be accentuated.

Figure 7:
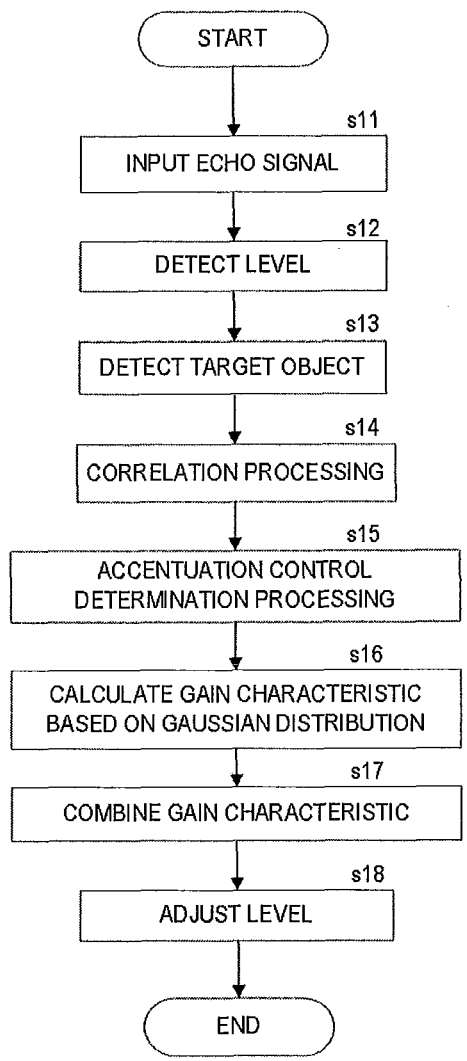
FIG. 7 is a flowchart showing operations of the radar apparatus of this embodiment.

FIG. 7 is a flowchart showing operations of the radar apparatus. The radar apparatus inputs the echo signals from the antenna 11 (s11). The level detection processing is carried out for the inputted echo signals by the reception module 12, and the processed data are stored in the sweep memory 14 as the sample data (s12).

The target object detection module 16 inputs the sample data from the sweep memory 14, and depending whether or not the value of each sample data exceeds the predetermined threshold, it detects the existence or absence of a target object at each location (s13). The correlation processing module 15 performs the scan-to-scan correlation processing for calculating the correlation between the newest sample data and the past sample data from the sweep memory 14 (s14). For example, if the echo signal as shown in the part (A) of FIG. 5 (component exceeding the threshold) is inputted, the echo signal will change by the scan-to-scan correlation processing to an echo signal as shown in the part (E) of FIG. 5. In this example, the level of the echo signal of the comparatively large target object moving at high speed falls, and the echo signal level of the comparatively small target object is weakened almost to the noise level by the scan-to-scan correlation processing.

Then, the accentuation control determination module 173 outputs the accentuation control signals as shown in the part (B) of FIG. 5 based on the detection results at each distance of a plurality of sweeps (five sweeps) (s15). As previously described, the accentuation control determination module 173 refers to the table as shown in FIG. 3 by using the detection results at the same distance for the five sweeps, including the currently-observing sweep, the two sweeps before and the two sweeps after the currently-observing sweep. Based on the reference to the table as shown in FIG. 3, the accentuation control determination module 173 then outputs to the level adjustment module 174 the accentuation control signal Y=1 to perform the accentuation processing and the accentuation control signal Y=0 not to perform the accentuation processing.

The level adjustment module 174 calculates the gain characteristic based on the Gaussian distribution centered on the location where the accentuation control signal Y=1 is set, as shown in the part (C) of FIG. 5 (s16). Furthermore, as shown in the part (D) of FIG. 5, the gain characteristics calculated for respective locations are combined to calculate the final gain characteristic (s17). Then, the level adjustment module 174 performs the accentuation processing (s18), and outputs the strong echo signal as shown in the part (F) of FIG. 5.

Figure 8A:
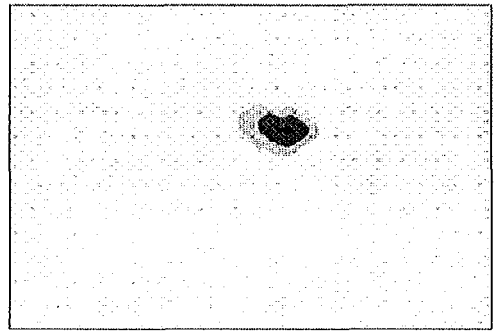
FIGS. 8A to 8C are schematic diagrams showing results of the level adjustment.
Figure 8B:
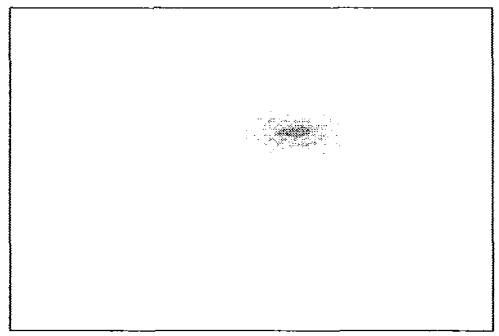
Figure 8C:
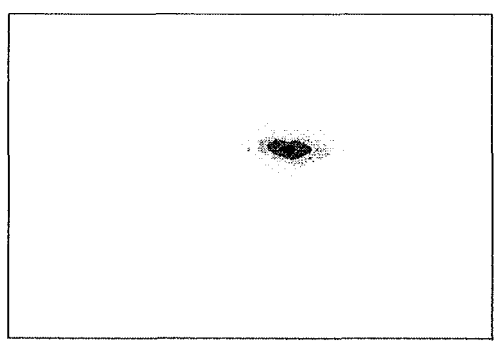

FIG. 8A is a schematic diagram of an echo image displayed based on the echo signals before the scan-to-scan correlation processing. FIG. 8B is a schematic diagram of an echo image displayed based on the echo signals after the scan-to-scan correlation processing. FIG. 8C is a schematic diagram of an echo image to which the level adjustment of this embodiment is performed. As shown in FIG. 8B, the scan-to-scan correlation processing suppresses random components, such as noise, and accentuates target object echoes but it weakens the echo signal of the target object moving at high speed (for example, a high-speed ship which moves at about 30 knots), which is shown at the center. On the other hand, as shown in FIG. 8C, as a result of the level adjustment, the echoes of the target object moving at high speed are also accentuated similarly to other target objects.

In the above embodiment, although calculated values of the level adjustment amount (gain) at respective locations where the accentuation control signal Y=1 is set are the same, the level adjustment amount may be changed depending on the pattern of the detection result for the five sweeps, including the currently-observing sweep, the two sweeps before and the two sweeps after the currently-observing sweep. For example, when all the accentuation control signals for the five sweeps are 1 (a target object exists), comparatively strong accentuation processing is performed. On the other hand, when the levels at locations closer to the antenna than the currently-observing location are lower, and conversely when the levels at locations more distant from the antenna than the currently-observing location are higher (for example, case when n−2 is 0, n−1 is 0, n is 1, n+1 is 1, and n+2 is 1), the accentuation is set weaker because it can be assumed to be an end of the target object.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having,"

"includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is designed in at least that way, but may also be configured in ways that are not listed.

What is claimed is:

1. A signal processing device, comprising:
    an echo signal input module configured to input echo signals from an antenna discharging electromagnetic waves to a predetermined area and to receive the echo signals reflected on a target object;
    an echo signal level detection module configured to detect a level of each of the echo signals from each location within the predetermined area;
    a target object detection module configured to detect the target object based on the levels of the echo signals and to output the target object signal levels;
    a correlation processing module configured to perform scan-to-scan correlation processing of a plurality of scans and to output processed levels of the echo signals based on the levels of the echo signals; and
    a level adjustment module configured to adjust the processed levels of the echo signals on the basis of at least one of the target object signal levels corresponding to the location of the target object, and to adjust the processed levels of the echo signals at a location outside the location where the target object detection module detects the target object.

2. The signal processing device of claim 1, wherein the level adjustment module performs the level adjustment with a characteristic based on a Gauss function, centered on each location where the target object detection module detects the target object.

3. The signal processing device of claim 2, wherein the level adjustment module performs the level adjustment with a level adjustment amount that is obtained by combining characteristics based on the calculated Gauss functions centered on the respective locations.

4. The signal processing device of claim 1, wherein
    the target object detection module detects a presence or absence of the target object at every location; and
    the level adjustment module performs the level adjustment when a pattern of the presence or absence of the target object at each location matches a predetermined pattern.

5. The signal processing device of claim 4, wherein the level adjustment module changes an amount of the level adjustment depending on the pattern.

6. The signal processing device of claim 1, wherein the target object detection module detects that the target object exists when the levels of the echo signals exceed a predetermined threshold.

7. The signal processing device of claim 6, wherein the target object detection module sets the threshold according to a distance of the echo signals from the antenna.

8. A radar apparatus, comprising:
    the signal processing device of claim 1;
    an antenna for revolving while discharging electromagnetic waves for every azimuth and receiving echo signals; and
    an echo image display module for displaying an echo image based on the echo signals after the level adjustment module adjusts the levels.

9. A method of processing signals, comprising:
    inputting echo signals from an antenna discharging electromagnetic waves to a predetermined area and receiving the echo signals reflected on a target object;
    detecting a level of each of the echo signals from each location within the predetermined area;
    detecting the target object based on the levels of the echo signals and outputting the target object signal levels;
    performing scan-to-scan correlation processing a plurality of scans and outputting processed levels of the echo signals based on the levels of the echo signals; and
    adjusting, by a processor, the processed levels of the echo signals on the basis of at least one of the target object signal levels corresponding to the location of the target object, and adjusting the processed levels of the echo signals at a location outside the location where the target object detection module detects the target object.

10. A non-transitory computer-readable program for processing signals, comprising:
    causing a computer to input echo signals from an antenna discharging electromagnetic waves to a predetermined area and receive the echo signals reflected on a target object;
    causing a computer to detect a level of each of the echo signals from each location within the predetermined area;
    causing a computer to detect the target object based on the levels of the echo signals and outputting the target object signal levels;
    causing a computer to perform scan-to-scan correlation processing of a plurality of scans and outputting processed levels of the echo signals based on the levels of the echo signals; and
    causing a computer to adjust the processed levels of the echo signals on the basis of at least one of the target object signal levels corresponding to the location of the target object, and causing the computer to adjust the processed levels of the echo signals at a location outside the location where the target object detection module detects the target object.

11. The signal processing device of claim 1, wherein the level adjustment module is configured to adjust the levels after the processing on the basis of a plurality of the target object signal levels corresponding to the location of the target object.

12. The method of claim 9, further comprising:
    adjusting the levels after the processing on the basis of a plurality of the target object signal levels corresponding to the location of the target object.

13. The non-transitory computer-readable program of claim 10, further comprising:
   causing a computer to adjust the levels after the processing on the basis of a plurality of the target object signal levels corresponding to the location of the target object.

* * * * *